United States Patent [19] — Thompson et al.
[11] 3,889,059
[45] June 10, 1975

[54] LOUDSPEAKING COMMUNICATION TERMINAL APPARATUS AND METHOD OF OPERATION

[75] Inventors: James Lawrence Earl Thompson; Wallace Eugene Clarke, both of Ottawa, Ontario; James Gale, Hazeldean, Ontario, all of Canada

[73] Assignee: Northern Electric Company Limited, Montreal, Quebec, Canada

[22] Filed: Mar. 26, 1973

[21] Appl. No.: 345,223

[52] U.S. Cl. ................................ 179/1 P; 179/81.8
[51] Int. Cl. ............................................ H04m 1/60
[58] Field of Search ....... 179/1 VC, 1 P, 1 H, 1 HF, 179/1 SW, 81 B

[56] References Cited

UNITED STATES PATENTS

| | | | |
|---|---|---|---|
| 2,736,771 | 2/1956 | Hanson | 179/1 HF |
| 3,046,354 | 7/1962 | Clemency | 179/81 B |
| 3,075,045 | 1/1963 | Clemency | 179/81 B |
| 3,160,707 | 12/1964 | Meyers | 179/1 P |
| 3,291,911 | 12/1966 | McCullough | 179/1 H |
| 3,562,791 | 2/1971 | Baker | 179/81 B |
| 3,588,360 | 6/1971 | Knox | 179/81 B |
| 3,725,585 | 4/1973 | Moniak | 179/81 B |

OTHER PUBLICATIONS

Torick and Allen, An Interphone System for Hands-Free Operation in High Ambient Noise, IEEE, Audio & Electronics, 12/1966, p. 148–163.

*Primary Examiner*—Kathleen H. Claffy
*Assistant Examiner*—E. S. Matt Kemeny
*Attorney, Agent, or Firm*—John E. Mowle

[57] ABSTRACT

The apparatus, in one embodiment as a speakerphone has transmit and receive channels and also includes a control means for alternately operating the apparatus in transmitting and receiving modes. The gain in the transmitting mode is regulated in inverse relation to substantially monotonous amplitude sound, as distinct from voice-like impulse amplitude sound. The natural tendency of a user to speak more loudly in a noisy environment characterized by the presence of monotonous ambient sound; is thereby compensated for and a more constant speech signal level is presented to the transmission facility. In a voice controlled speakerphone embodiment there is also an idle mode of operation in which the gain in the transmit channel is likewise regulated by the amount of substantially monotonous ambient room noise.

9 Claims, 6 Drawing Figures

LOUDSPEAKING COMMUNICATION TERMINAL APPARATUS AND METHOD OF OPERATION

The present invention relates to loudspeaking communications terminals having transmitting and receiving modes of operation.

A loudspeaking communication terminal apparatus typically includes a transmit channel, having a microphone followed by an amplifier, and a receive channel, having an amplifier followed by a loudspeaker. In the transmitting mode of operation, the microphone picks up acoustical signals from its surrounding envionment. These signals are amplified and coupled to an appropriate transmission facility, for example a telephone line, typically via a hybrid circuit. In the receiving mode of operation signals from the transmission facility are coupled to the receive channel via the hybrid circuit and broadcast in the form of acoustical signals.

When operating in the transmitting mode, it is desirable to have some means to limit or control the amount of signal energy coupled to the transmission facility, so that a person receiving the signals from the transmission facility, receives sufficient volume for intelligibility but not so much volume as would cause discomfort and/or undue signal distortion. One solution is the inclusion of a manually adjusted volume control in the transmitting channel. However this is an inconvenience for the user and when misadjusted merely intensifies the problem. Another solution is one or more limiting devices associated with the hybrid circuit or the transmission facility. Limiting devices such as for example back-up-back diodes or varistors tend to introduce considerable clipping distortion and are generally used only to eliminate very loud noise such as clicks, bangs and thumps. Yet another means of volume regulation is a compression circuit on automatic volume control. While a very constant speech signal level can be obtained using such a device, pauses in speech tend to be filled with a high background or ambient noise signal. A further disadvantage is that the user's normal speech volume and inflection tend to be masked by the automatic volume control action.

It is generally well known that a person speaking in a noisy environment tends to speak up more loudly than a person speaking in a relatively quiet environment. It has been found that when the gain or amplification of the transmit channel, in a loudspeaking communication terminal, is regulated in inverse relation to background or ambient acoustical noise a number of advantages are realized. the transmitted signals tend to have constant ambient noise level regardless of the ambient noise received by the microphone. The user's speech level, normally varying, although not linearly, with ambient noise level, tends to have a relatively constant level after it has been received by the microphone and amplified. Thus speech signals, received by a listening party, are typically of a preferred listening level and natural sounding.

It has also been found that this type of gain control, in the transmit channel, is particularly advantageous when applied to voice switched loudspeaking communication terminals. In one application, the gains of the respective channels may be regulated so that there are three modes of operation, a transmitting mode, a receiving mode and an intermediate or idling mode. When the terminal is in the idling mode this type of gain control prevents significant biasing toward the transmitting mode by ambient noise received by the microphone. Hence the terminal will only leave the idling mode and assume the transmitting mode of operation in response to signals from the microphone having speech signal envelope characteristics.

It is well known in voice controlled apparatus that a degree of delay or so-called hang-over in switching between receive and transmit modes of operation, is desirable. It has been determined that an improvement in the operation of voice controlled apparatus is obtained if the ambient noise detected, in the apparatus, is artificially augmented during operation in the receive mode. Thus the apparatus is restrained from rapidly switching to the transmit mode at the ends of words and syllables in response to delayed acoustical signals transmitted from its speaker to its microphone.

The present invention is an improvement in a loudspeaking communication terminal apparatus. The terminal apparatus is intended for connection to a transmission facility and includes a control means for operating the terminal in transmitting and in receiving modes of operation. The improvement comprises a means for generating a noise reference signal representative of acoustical ambient noise of a monotonous amplitude nature, as compared to voice-like impulse sound in the environment in which the apparatus is operating. A regulating means, controls amplification in the communication terminal, when the terminal is in the transmitting mode of operation. The regulating means is responsive to the noise reference signal so that the amplification is controlled in inverse relation to the noise reference signal. Thus, the tendency of a user to speak more loudly in an environment characterized by the presence of substantially monotonous noise, than in a quieter environment, is compensated for and a more constant speech signal level is presented to the transmission facility.

The present invention is a method of controlling the amplification in a loudspeaking communication terminal apparatus intended for connection to a transmission facility. The apparatus is characterized in that it is operable in a transmitting and in receiving modes of operation. The method comprises the steps of generating a noise reference signal representative of acoustical ambient noise of a monotonous nature, as compared to voice-like impulse sound in the environment in which the apparatus is operating, and regulating the amplification in inverse relation to the noise reference signal, when the apparatus is operating in the transmitting mode. The natural tendency of a user to speak more loudly in a noisy environment characterized by the presence of substantially monotonous sound, than in a quieter environment, is thus compensated for and results in a more constant speech signal level being presented in the transmission facility.

An example embodiment is described in the following with reference to the accompanying drawings in which.

Figure 1:
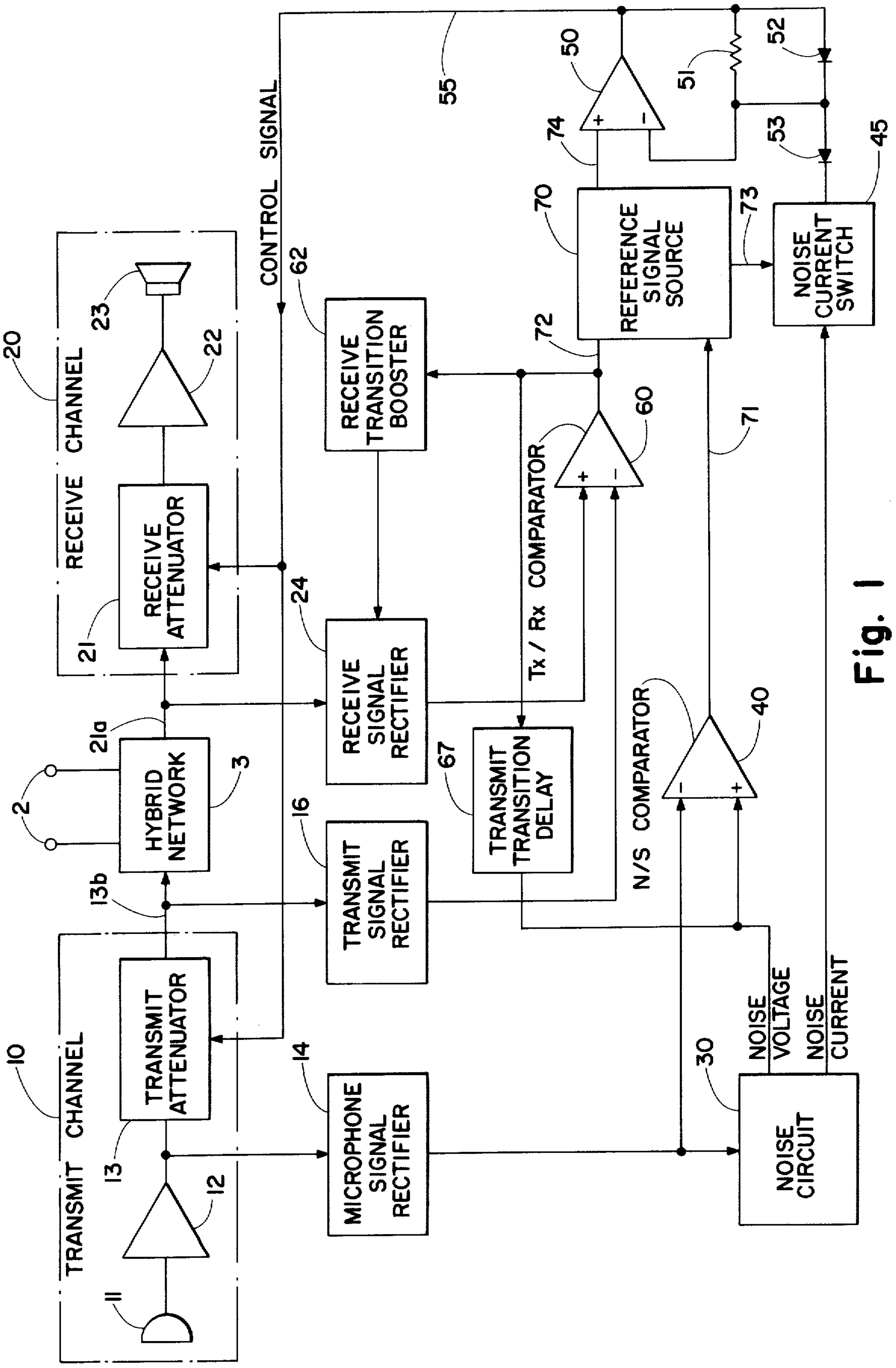
FIG. 1 is a block schematic drawing of a voice controlled loudspeaking communications terminal apparatus or speakerphone in accordance with the invention.

Referring of FIG. 1, the speakerphone includes a transmit channel 10 a receive channel 20, with a hybrid network 3 connected therebetween and having terminals 2 for connection to a telephone line or other transmission facility. The remainder of the circuitry provides control for the transmit and receive channels 10 and 20 respectively via a control signal lead 55.

The transmit channel 10 includes a microphone 11 connected to the input of an amplifier 12, the output of which is connected to the input of a transmit attenuator 13. The output of the transmit attenuator 13 is connected to the input of the hybrid network 3. The receive channel 20 includes a receive attenuator having an input connected to the output of the hybrid network 3. The output of the receive attenuator 21 is connected to the input of an amplifier 22. The output of the amplifier 22 is connected to a loudspeaker 23.

The output of the amplifier 12 is also connected to the input of a microphone signal rectifier 14. The output of the microphone signal rectifier 14 is connected to the input of a noise circuit 30 and to the inverting input of a noise/signal (N/S) comparator 40. The output of the transmit attenuator 13 is also connected to the input of a transmit signal rectifier 16, the output of which is connected to the inverting input of a transmit/-receive (Tx/Rx) comparator 60. The output of the hybrid network 3 is also connected to an input of a receive signal rectifier 24, the output of which is connected to the non-inverting input of the Tx/Rx comparator 60. The noise circuit 30 includes a noise current output lead connected to a noise current switch 45 and a noise voltage output lead connected to the non-inverting input of the N/S comparator 40. The output of the N/S comparator 40 is connected to an input signal source 70 via a noise/signal (N/S) lead 71. The output of the Tx/Rx comparator 60 is connected to an input of the reference signal source 70 via a transmit/-receive (Tx/Rx) lead 72. The Tx/Rx lead 72 is also connected to the input of a receive transition boost circuit 62 and to the input of a transmit transition delay circuit 67. The output of the receive transition boost circuit 62 is connected to an input of the receive signal rectifier 24. The output of the transmission transition delay circuit 67 is connected to the non-inverting input of the N/S comparator 40.

The output of the reference signal source 70 is connected to the non-inverting input of a differential amplifier 50, via a reference signal lead 74. A control output of the reference signal source 70 is connected to the control input of the noise current switch 45 via a control lead 73. The output of the noise current switch is connected to the cathode of a diode 53, the anode of which is connected to the inverting input of the differential amplifier 50. A feedback resistor 51 is connected between the output and the inverting input of the differential amplifier 50. The anode and the cathode of a diode 52 are connected to the output and the inverting input of the differential amplifier 50, respectively. The control signal lead 55 connects the output of a differential amplifier 50 with the control inputs of the transmit and receive attenuators 13 and 21.

Very briefly stated, the example embodiment has three distinct modes of operation, a transmit mode, a receive mode and an idle mode, intermediate the transmit and receive modes. The mode of operation at any moment is primarily determined by the amount of signal appearing at the output of transmit attenuator 13 in relation to the amount of signal at the output of the hybrid 3 and secondarily by the amount of speech signal received by the transmitting channel 10 in relation to ambient noise of a monotonous nature. The advantage of having an idle mode lies in having a reduced degree of switching required for the speakerphone to assume either of the other two modes. Hence the transition rate is desirably rapid without incurring undue audible switching transients. Another feature in the present embodiment is the use of the ambient monotonous noise level to temper the gain of the transmit channel 10 while the speakerphone is operating in either the transmit mode or the idle mode.

In more detail, acoustical voice signals are picked up by the microphone 11 and amplified by the amplifier 12. The microphone signal rectifier 14 provides a rectified signal corresponding to the signals picked up by the microphone 11. This rectified signal is further processed by the noise rectifier 30 to provide a noise voltage and a noise current proportional to the ambient noise in the environment in which the apparatus is operating. When the noise voltage and the rectified signal are substantially the same, that is in the absence of significant speech envelope signals, the output of the N/S comparator 40 is high. Signals from the output of the transmit attenuator 13 are conducted in the transmit signal rectifier 16 and rectified. Signals from the output of the hybrid network 3 are conducted to the receive signal rectifier 24 where the signals are rectified. The rectified signals from the outputs of the transmit and receive signal rectifiers 16 and 24, which are referred to as Tx and Rx signals respectively, are compared by the Tx/Rx comparator 60. The output of the comparator 60 is high when the Rx signal is greater than the Tx signal and low when the Tx signal is about the same or greater than the Rx signal. The reference signal source 70 functions to provide a variable reference signal under the control of the potentials on the N/S and Tx/Rx leads 70 and 72. The variable reference signal appears on the lead 74 and a control signal is also provided on the lead 73 to control the noise current switch 45.

Noise current is developed in the noise circuit 30 and under the control of the noise current switch is abstracted from the output of the differential amplifier 50 via the diode 52 in parallel with the resistor 51 and via the diode 53. Thus when the noise current switch diverts the noise current from this path, the feedback around the differential amplifier is essentially established by the resistor 51 and the amplifier 50 operates as a voltage follower. The variable reference signal is supplied to the lead 55 accordingly. In the case where the noise current switch permits current to flow through the diode 53, the voltage at the output of the amplifier 50 is more positive than the reference signal on the lead 74 by an amount substantially equal to the forward voltage drop across the diode 52 in parallel with the resistor 51.

The control signal from the output of the differential amplifier 50 controls the transmit attenuator 13 and the receive attenuator 21. In this embodiment the attenuators 13 and 21 are of the well known type which attenuate by an amount corresponding to the logarithm of the difference between a pair of control voltages. The control signal from the amplifier 50 varies over a range which lies between a lower reference voltage in the transmit attenuator 13 and a higher reference voltage in the receive attenuator 21. Thus the sum total of the respective attenuations is always a constant. For example, when the transmit attenuator is controlled to insert relatively little attenuation in the transmit channel 10, the receive attenuator 21 is controlled to insert a relatively high amount of attenuation in the receive channel 20. In this case the apparatus is in the transmit mode of operation. In the case where the degrees of attenuation with respect to the attenuators is reversed, i.e., by a rise in potential of the control signal, the apparatus is in the receive mode of operation. When there is little or no signal being received from the transmission facility via the hybrid network 3 and substantially no speech signals being transmitted onto the transmission facility via the hybrid network 3, the control signal is of such potential to maintain the respective attenuators 13 and 21 at intermediate amounts of attenuation. In this case the apparatus is in the idle mode of operation.

The receive transition boost circuit 62 and the transmit transition delay circuit 67 are included to aid in preventing undesirable or premature switching from the receive mode of operation into the transmit mode of operation. When the receive signal from the receive signal rectifier 24 becomes greater than the transmit signal from the transmit signal rectifier 16 the output of the comparator 60 rises in potential. The receive boost circuit 62 is sensitive to positive going signals at the output of the comparator 60 and responds by augmenting the amplitude of the output of the receive signal rectifier 24. This augmentation is relatively minimal compared to typical speech signals received by the rectifier 24. However, in cases where the receive signal is of a reasonably low amplitude this augmentation serves to more positively drive the speakerphone into the receive mode of operation.

The transmit transition delay circuit 67 couples some of the signal from the output of the Tx/Rx comparator 60 to the non-inverting input of the N/S comparator 40 when this signal is high. Excursions to a lower amplitude are excluded from the non-inverting input of the comparator 40 and hence when in the receiving mode, a significant amount of speech signal from the microphone signal rectifier 14 is required before the output of the comparator 40 moves to a low state. This low state, of course, indicates to the reference signal source that there is a significant speech signal from the user. The transmission transition delay circuit 67 has the effect of inhibiting false switching into the transmit mode of operation when the apparatus is used in an environment having a significant amount of acoustical echo or delay. Hence the ends of syllables and words broadcast from the speaker 25 which are delayed and thereafter picked up by the microphone 11 tend to be ignored thus reducing the frequency of invalid switching into the transmit mode of operation.

Figure 2:
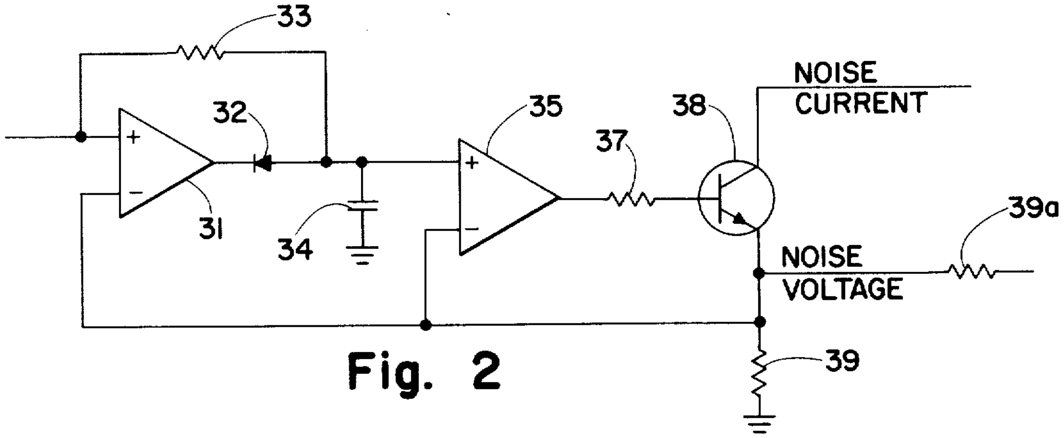
FIG. 2 is a schematic drawing of a noise circuit used in the speakerphone in FIG. 1.

Referring to FIG. 2, the output from the microphone signal rectifier 14 is connected to the non-inverting input of a comparator 31. The cathode of a diode 32 is connected to the output of the comparator 31. The anode of the diode 32 is connected to the non-inverting input of a differential amplifier 35. A resistor 33 is connected between the non-inverting inputs of the comparators 31 and 35. A capacitor 34 is connected between the non-inverting input of the comparator 35 and ground. The output of the differential amplifier 35 is connected to the base electrode of a transistor 38 via a resistor 37. The emitter electrode of the transistor 38 is connected to the inverting inputs of the comparators 31 and the differential amplifier 35, to a resistor 39*a* and to ground via a resistor 39.

In operation, the noise circuit in FIG. 2 provides the ambient noise voltage and current signals. The circuit responds very slowly to positive going signals and very rapidly to negative going signals so that at the output of the differential amplifier 35 a signal appears which is substantially related to the ambient noise in the operating environment of the apparatus. Here and in the remainder of the disclosure, "noise" in taken to mean, signals of a monotonous or generally steady nature as compared with typical speech envelope signals, which are well known to have an irregular impulse envelope characteristic. The output signal is substantially unaffected by speech content in the signal from the microphone signal rectifier 14. The transistor 38 operates as an emitter follower. The signal from the output of the differential amplifier 35 is connected to the base of the transistor 38 via the resistor 37 and hence a corresponding voltage signal appears at the emitter electrode of the transistor 38. This signal or noise voltage develops a linearly related current through the resistor 39, which then is available as a noise current at the collector electrode of the transistor 38.

A positive going signal, at the non-inverting input of the comparator 31 slowly charges the capacitor 34 via the resistor 33. The rate at which the capacitor 34 charges is determined by the RC time constant of the capacitor 34 and the resistor 33. The resulting voltage on the capacitor 34 is amplified by the differential amplifier 35 by an amount substantially related to a negative feedback voltage, i.e., the noise voltage, derived across the resistor 39.

In the case of a negative going signal at the non-inverting input of the comparator 31, the output thereof goes low, discharging the capacitor 34 via the diode 32. Hence the output from the differential amplifier 35 is rapidly reduced. Correspondingly the voltage across the resistor 39 is reduced at the same rate as the negative going signal until the feedback voltage and the signal at the input of the comparator 31 are about equal. At this moment the output of the comparator 31 rises, ceasing to further discharge the capacitor 34.

The differential amplifier 35 acts as a buffer amplifier. The resistor 37 is included merely to prevent significant forward current across the base collector junction of the transistor 38 in the event that the transistor 38 approaches saturation. This can occur in the presence of very high noise. Were it not for the resistor 37, it would be possible for the noise current at collector of the transistor 38 to be reduced by current from the output of amplifier 35 while the noise voltage developed remains as the output voltage from the amplifier 35. Hence the resistor 37 substantially maintains the required relationship between the noise current and the noise voltage by preventing heavy saturation of the transistor 38. In this embodiment it is considered more important to maintain the noise voltage and current substantially in linear relationship one with the other rather than to directly accommodate seldom occurring very high noise levels. The attack time constant, i.e., response to positive going signals, is determined by the resistor 33 and the capacitor 34 and is about 5 seconds. The release time constant, i.e., response to negative going signals, is virtually instantaneous and in overall effect is the same as the release time constant of the rectifier 14, in FIG. 1.

Figures 3, 4, 5, 6:
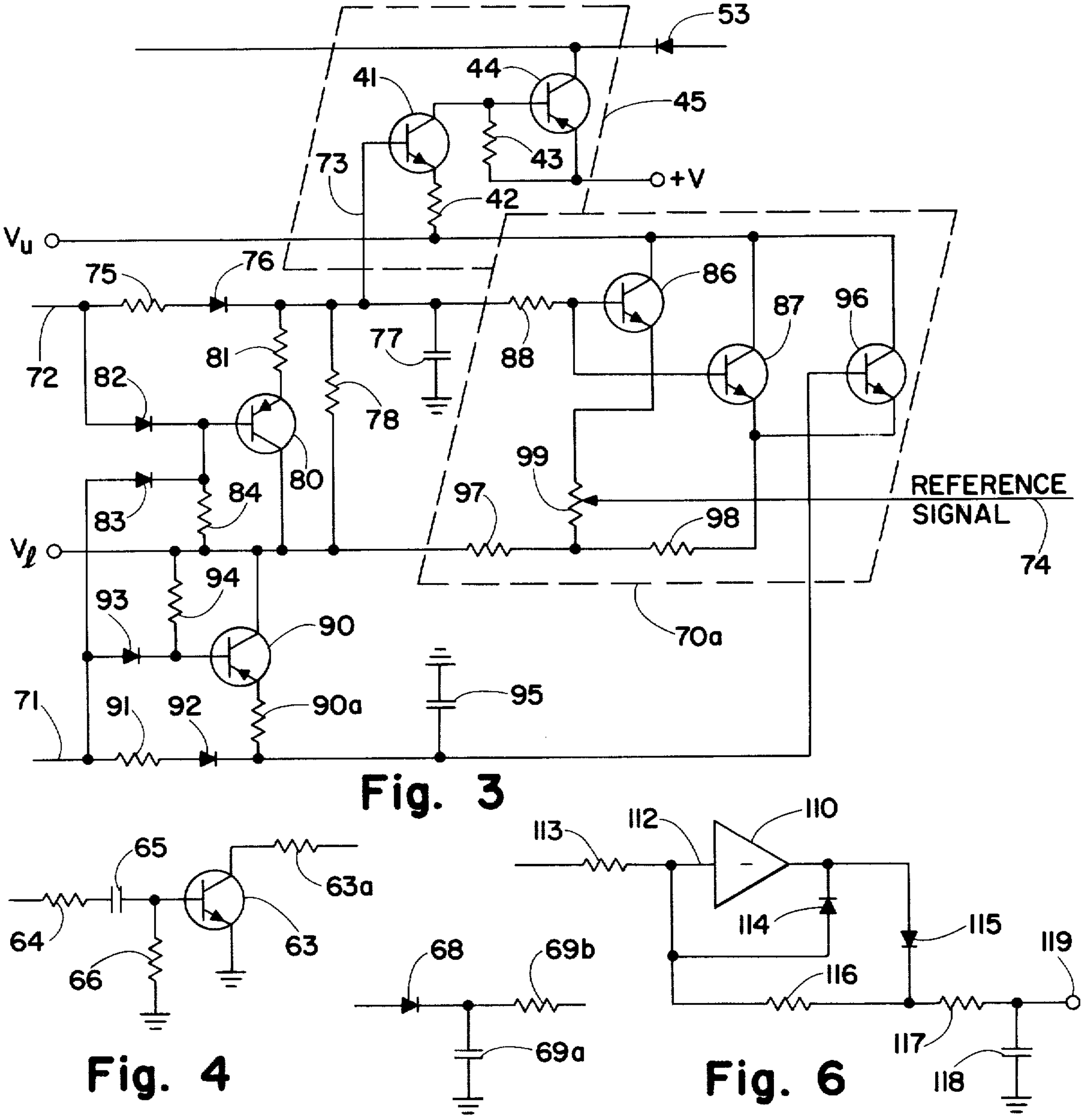
FIG. 3 is a schematic drawing of a reference signal source and of a noise current switch used in the speakerphone in FIG. 1.
FIG. 4 is a schematic drawing of a receiver transition boost circuit used in the speakerphone in FIG. 1.
FIG. 5 is a schematic drawing of a transmit transition delay circuit used in the speakerphone in FIG. 1.
FIG. 6 is a schematic drawing of a rectifier circuit used in the speakerphone in FIG. 1.

Referring to FIG. 3, the Tx/Rx lead 72 is connected to the anode of a diode 82 and to one end of a resistor 75. The cathode of the diode 82 is connected to the base electrode of a PNP transistor 80. The other end of the resistor 75 is connected to the anode of a diode 76, the cathode of which is connected to the emitter electrode of the transistor 80 via a resistor 81, to ground via a capacitor 77, to the control lead 73, and, via a resistor 88, to the base electrode of a NPN transistor 86 and to the base electrode of a NPN transistor 87. The cathode of the diode 76 is also connected to a lower limit voltage terminal $V_l$ via a resistor 78. The collector electrode of the transistor 80 is connected to the voltage terminal $V_l$. The base electrode of the transistor 80 is connected to the voltage terminal $V_l$ via a resistor 84.

The N/S lead 71 is connected to the anode of a diode 83, to the anode of a diode 93 and to one end of a resistor 91. The cathode of the diode 83 is connected to the base electrode of the transistor 80. The cathode of the diode 93 is connected to the base electrode of a PNP transistor 90 and to the voltage terminal $V_l$ via a resistor 94. The collector electrode of the transistor 90 is connected to the voltage terminal $V_l$. The other end of the resistor 91 is connected to the anode of a diode 92, the cathode of which is in turn connected to the emitter electrode of the transistor 90 via a resistor 90*a*, to ground via a capacitor 95 and to the base electrode of a NPN transistor 96.

The collector electrodes of the transistors 86, 87 and 96 are all connected to an upper limit voltage terminal $V_u$ . The emitter electrodes of the transistors 87 and 96 are connected in common to the voltage terminal $V_l$ via a pair of series connected resistors 98 and 97. The emitter electrode of the transistor 86 is connected via a potentiometer 99 to the junction between the resistors 97 and 98. The reference signal output lead 74 is connected to the adjustable contact of the potentiometer 99.

The operation of the circuitry in FIG. 3 in conjunction with the apparatus as a whole is described later.

Referring to FIG. 4, the output of the Tx/Rx comparator 60, in FIG. 1, is connected to the base electrode of a NPN transistor 63 via a resistor 64 in series with a capacitor 65. The base electrode of the transistor 63 is also connected to ground via a resistor 66. The collector electrode of the transistor 63 is connected via a resistor 63*a*, to the receive signal rectifier 24, as shown in FIG. 1.

In operation, a positive going voltage is transmitted via the resistor 64 and the capacitor 65 to the base electrode of the transistor 63, thereby switching the transistor 63 ON. The potential at the collector electrode of the transistor 63 tends towards ground and the resulting current pulse is drawn from the receive signal rectifier 24. The duration of the current pulse is substantially determined by the resistors 64 and 66 and the capacitor 65. In this embodiment a current pulse having a duration of between about 40 to 80 msec. has been found satisfactory. The resistor 66 also functions to maintain the transistor 63 OFF until all other conditions, including partial positive going excursion at the output of the Tx/Rx comparator 60.

Referring to FIG. 5, the output of the Tx/Rx comparator 60 is connected to the anode of a diode 68, the cathode of which is connected to one end of a capacitor 69*a* and to the non-inverting input of the N/S comparator 40 via a resistor 69*b*. The other end of the capacitor 69*a* is connected to ground.

In operation the capacitor 69*a* charges rapidly to the potential at the output of the Tx/Rx comparator 60 via the diode 68. When this potential is reduced the capacitor 69a discharges toward the potential of the noise voltage across the resistor 39, in FIG. 2, at a slow rate as determined by the RC time constant of the capacitor 69*a*, the resistor 69*b* and the resistor 39*a* in FIG. 2. A satisfactory time constant has been found to be about 100 msec. Hence in cases where the noise voltage is relatively low it is somewhat augmented at the non-inverting input of the N/S comparator 40, during terminal operation in the receive mode and for a short time thereafter.

Referring to FIG. 6, the rectifier illustrated is used to provide the microphone signal rectifier 14, the transmit signal rectifier 16 and the receive signal rectifier 24. An operational amplifier 110 has an input 112 for connection of an ac coupled input signal thereto via an input resistor 113. The anode of a diode 114 is connected to the input 112 and the cathode of the diode 114 is connected to the output of the amplifier 110. A resistor 116 is connected between the input 112 and the cathode of a diode 115, the anode of which is connected to the output of the amplifier 110. The junction between the resistor 116 and the diode 115 is connected to an output terminal 119 via a resistor 117. A capacitor 118 is connected between the output terminal and ground.

In operation, a positive going input signal arriving at the input 112 via the resistor 113 causes conduction via the diode 114. Hence the amplifier gain is virtually unity. When the input signal is negative going the diode 115 conducts current and the gain of the amplifier is determined substantially by the resistance ratio of the resistor 113 and 116, in a well known manner. The combination of the resistor 117 and the filter capacitor 118 provides the required attack time in the rectifier. The release time is provided by a discharge path which includes the resistor 117, the resistor 116 and the diode 114. For example, in one embodiment the Rc attack time constant provided in the microphone signal rectifier 14 is between 4 and 5 msec., and in the transmit and receive signal rectifier 16 and 24 the time constant is between 1 and 2 msec. The release time constant in the transmit and receive signal rectifiers 16 and 24 is about 50 msec. and in the microphone signal rectifier 14 is about 26 msec.

In the preceding, a general description of a voice controlled loudspeaking communication terminal and with emphasis on various parts thereof has been given. If the microphone 11 of the capacitance type, for example or electret microphone with suitable adaptive circuitry, the illustrated embodiment is particularly well suited to being contained in a single unitary enclosure. In addition this particular embodiment may be advantageously utilized to enable hands free telephone conversation. The operation of the terminal as a functional unit connected for example to a subscriber loop, via the terminals 2 may be more clearly understood with reference to the following summary description and to the drawings.

Since the gain requirements of the transmit and receive channels in speakerphone are much higher than with an ordinary telephone subset, both channels cannot be ON at the same time. Otherwise, the terminal would break into oscillation through acoustic coupling via the speaker 23, the microphone 11 and sidetone coupling via the hybrid network 3. The transmit and receive attenuators 13 and 21, or variolossers, overcome this problem in a well known manner, i.e., by having one channel ON while the other is OFF. The amount of loss switched in the variolossers is just sufficient to keep the overall loop gain of the terminal apparatus slightly below unity.

In the transmit mode, i.e. when a user is speaking, the transmit channel 10 is switched on by the transmit attenuator 13 passing the amplified microphone signal to the terminals 2, i.e., the subscriber loop or line, via the hybrid network 3. The receive channel 20 is switched OFF by the receive attenuator 21, thereby preventing the microphone and line signals from appearing at the loudspeaker 23. In the receive mode, i.e., when a remote party is speaking, the reverse switching process occurs, passing signals from the line to the loudspeaker 23 and blocking microphone signals from appearing at the line. In an idle mode of operation the transmit and receive attenuators 13 and 21 are maintained in a semi-ON and semi-OFF state respectively. The idle mode occurs in the absence of significant speech-like signals from the microphone and in the absence of significant signals from the line.

Since the terminal state or mode of operation is controlled by voice, the control circuitry is speech envelope sensitive. In the case where the signal from the receive signal rectifier 24 is higher than the signal from the transmit signal rectifier 16, the output of the Tx/Rx comparator 60, i.e., the lead 72, is high. Thus the terminal apparatus is held in the receive mode. When the signal from the transmit signal rectifier 16 is about the same or greater than the signal from the rectifier 24, the output of the comparator 60 is low.

The output of the N/S comparator 40 is low only in the presence of signals from the rectifier 14 having speech-like envelope characteristics. The conditions of the leads 71 and 72, control the reference signal source 70.

Assuming the terminal is in the idle mode of operation, the output of the Tx/Rx comparator 60 is low. The capacitor 77 is charged to the lower reference voltage via the resistor 78. As the transistors 41 and 44 are OFF, the noise current adjusts the output potential of the amplifier 50. Since the transistor 86 is OFF no current flows through the potentiometer 99 and as the transistor 96 is ON the voltage at the junction of the resistors 97 and 98 is slightly higher than the lower reference voltage and appears at the wiper of the potentiometer 99. Thus the voltage at the output of the amplifier 50 is the reference signal voltage on the lead 74 plus the voltage drop across the diode 52 and the resistor 51 caused by the noise current. This control signal voltage causes the transmit attenuator 13 to be semi-ON, having a typical loss of about 10 db more than when the transmit channel is ON, while the receive attenuator 21 is semi-OFF having typically a loss of about 37 db more than when the receive channel is ON.

When speech envelope signals are received by the microphone 11, the output of the N/S comparator 40 becomes low. The transistor 90 turns ON, very rapidly discharging the capacitor 95 which turns the transistor 96 OFF. Hence the reference signal voltage on the lead 74 is reduced to the lower reference voltage. The output of the amplifier 50 is now restrained from assuming the lower reference voltage only by the noise current. The terminal is now in the transmit mode of operation. Hence the loss in the transmit attenuator 13 is regulated substantially in inverse relation to the room noise received by the microphone 11. When the speech-like envelope signals received by the microphone 11 are reduced to below the noise threshold at the N/S comparator 40, the output of the comparator 40 rises, the transistor 90 is turned OFF and the capacitor 95 charges slowly via the resistor 91 and the diode 92. This results in the terminal returning slowly to the idle mode in correspondence with the resulting slow turn on of the transistor 96.

When a signal is received from the line, via the hybrid network 3, which is effectively greater than the signal from the transmit attenuator 13, the voltage at the output of the Tx/Rx comparator 60 increases. The capacitor 77 is charged rapidly via the resistor 75 and the diode 76 to a voltage higher than the upper voltage limit. Hence the transistor 86 is turned ON applying the upper limit voltage to the one end of the potentiometer 99. The transistor 87 is also turned ON and the resulting current flow through the resistor 98 combined with the current flow in the potentiometer 99 all flowing through the resistor 97, establishes the voltage at the junction of the three resistance elements. This voltage is about the same as if the terminal were in the idle mode. Hence any voltage between the upper reference voltage and the idle mode voltage is available at the wiper of the potentiometer 99. Accordingly, the gain in the receive channel is manually adjustable from idle mode through the full receive mode. In the receive mode of operation, the noise current switch is turned ON and shunts the noise current to the positive voltage supply +V and hence the noise current has no effect upon the output of the amplifier 50. The control of the noise current is disabled particularly so that dial tone or other line noise feeding into the microphone from the speaker via acoustic coupling will not automatically increase the amplification in the receive channel 20.

When the signal from the line substantially decreases or disappears the voltage at the output of the Tx/Rx comparator 60 returns to its low state and when for example the transistor 80 is maintained OFF by the voltage of the output of the N/S comparator 40 being high, the capacitor 77 discharges very slowly through the resistor 78. Hence the circuit returns slowly to the idle mode. When for example there is a substantial voice signal received by the transmit channel 10, the transistor 80 turns ON and the capacitor 77 discharges rapidly via the resistor 81. In order that the transistor 80 be turned ON the voltages at the outputs of the comparators 60 and 40 must both be low. In this case the terminal has returned rapidly to the transmit mode.

In one example apparatus similar to the above-described embodiment switching transient times, from one mode of operation to another, are given in the following table.

| MODE OF OPERATION FROM | TO | DELAY TIME | TRANSITION TIME |
|---|---|---|---|
| Transmit | Idle | — | about ½ sec |
| Receive | Idle | about 0.4 sec. | about 1 sec. |
| Idle | Transmit | — | about 35 msec. |
| Idle | Receive | — | about 20 msec. |
| Transmit | Receive | — | about 22 msec. |
| Receive | Transmit | — | about 50 msec. |

These transition times are primarily determined by the time constants of the charging and discharging circuit paths associated with the capacitors 78 and 95 in FIG. 4. The degree or amount of gain in the transmit channel 10 when the apparatus is in the transmit or idle modes is, as before described, substantially influenced by the amount of noise present in the operating environment.

During a transition into the receive mode of operation, the receive transition boost circuit 62 generates a pulse in response to the positive going voltage at the output of the Tx/Rx comparator 60. The pulse width is determined by the resistors 64 and 66 in combination with a capacitor 65. The pulse is inverted and shaped by the transistor 63 and amplitude limited by the resistor 63a. This pulse simulates a small burst of signals from the line but is negligible in comparison to average line levels. This pulse augments weak line signals making them look like average speech line signals and thereby prevents a rapid transition back to the transmitting mode immediately after entering the receive mode.

The transmit transition delay circuit 67 artificially increases or augments the noise threshold at the N/S comparator 40 during operation in the receive mode. Hence at the ends of words or syllables when the voltage at the output of the Tx/Rx comparator 60 becomes low, the capacitor 69*a* discharges slowly through the resistor 69*b*. Thus the threshold of the N/S comparator 40 returns slowly to a level determined by the ambient room noise. This augmentation prevents impulses and echoes from forcing the terminal quickly into the transmit mode as such forcing tends to result in clipping of the last syllables of words received. The duration and degree of threshold augmentation is chosen to best enable typical conversation.

The receive transition boost circuit 62 and the transmit transition delay circuit 67 are not essential to the satisfactory operation of the presently disclosed voice controlled loudspeaking communication terminal. However their inclusion in the terminal provides a degree of improvement which is pleasing to the everyday user. This is particularly true of the effect of the delay circuit 67. The random though infrequent invalid returns to the transmit mode, which will tend to occur in some operating environments, is substantially eliminated by the receive transition boost circuit 62.

The method by which the gain of the transmit channel 10 is controlled by noise when the terminal is in the transmit mode, although shown applied to a voice controlled terminal, is generally applicable to all types of loudspeaking communications terminals whether controlled manually or otherwise. It would be ideal to be able to exercise control over the gain of a transmit channel, according to the level of background sound in total in the operating environment. However, a compromise as above described, i.e., responding only to background noise of a monotonous or rather steady nature permits the use of relatively simple sensing circuitry to provide for a noise circuit, as for example the noise circuit 30. In most operating environments, this feature yields a substantial improvement in the operation of a loudspeaking communication terminal.

What we claim is:

1. In a loudspeaking communication terminal apparatus for connection to a transmission facility and having a transmit channel including a microphone, a receive channel including a loudspeaker, and a control means for activating the transmit channel to provide a transmit mode of operation and for activating the receive channel to provide a receive mode of operation, an improvement in the control means comprising:

means, responsive to signals from the microphone, having substantially monotonous amplitude envelope characteristics and substantially non-responsive to other signals, for generating a noise reference signal, representative of sounds of a substantially steady nature in the operating environment;

means, responsive to the activating of the transmit channel, for regulating the amplification thereof in inverse relation to the amplitude of the noise reference signal, whereby the natural tendency of a user to speak more loudly in a noisy environment, characterized by substantially monotonous noise, than in a quieter environment, is compensated to present a more constant signal level to the transmission facility.

2. In a voice controlled loudspeaking communication terminal apparatus for connection to a transmission facility and having a transmit channel including a microphone, a receive channel including a loudspeaker, and a control means for activating the transmit channel to provide a transmit mode of operation and for activating the receive channel to provide a receive mode of operation, an improvement in the control means comprising:

means, responsive to signals from the microphone, having a substantially monotonous amplitude envelope characteristic and substantially non-responsive to other signals, for generating a noise reference signal, representative of sounds of a substantially steady nature in the operating environment;

means, responsive to the activating of the transmit channel for regulating the amplification thereof in inverse relation to the amplitude of the noise reference signal, whereby the natural tendency of a user to speak more loudly in a noisy environment, characterized by substantially monotonous noise, than in a quieter environment, is compensated to present a more constant signal level to the transmission facility;

means for comparing signals received by the transmit channel with a threshold level as determined by the noise reference signal, whereby the presence of voice speech-like envelope signals received by the transmit channel and in excess of the threshold level is indicated, said indication functioning to urge the apparatus into the transmit mode of operation in the absence of significant signals from the transmission facility;

means for augmenting the threshold level during operation in the receive mode and for a time thereafter whereby the comparing means is substantially prevented from providing said indication in response to the ends of syllables and words from the receive channel which have been acoustically delayed by the operating environment.

3. In a voice switched loudspeaking communications terminal apparatus capable of being operated in transmit, idle and receive modes and having: a terminal channel and a microphone connected to the input thereof, a receive channel, the channels including a variable transmit attenuator and a variable receive attenuator respectively, said attenuators controllable so that the product of their respective insertion losses is substantially constant; and a coupling means, for coupling signals from the output of the tranmit channel to a transmission facility and for coupling signals from the transmission facility to the receive channel; a control circuit comprising;

means responsive to signals at the input of the receive channel, having substantially monotonous amplitude envelope characteristics, as distinguished in comparison with the impulse amplitude envelope characteristics of voice speech-like signals, for generating a noise signal corresponding only to substantially monotonous amplitude sounds received by the transmit channel;

means for generating a reference signal having a first predetermined potential corresponding to operation in the receive mode, when the signal from the coupling means is effectively greater than the signal from the transmit attenuator; the reference signal having a second predetermined potential corresponding to operation in the transmit mode, when the signal from the transmit attenuator is effectively greater than the signal from the coupling means; the reference voltage having a third predetermined potential intermediate the first and second potentials corresponding to operation in the idle mode, when the signal from the transmit attenuator is effectively about the same magnitude as the signal from the coupling means and substantially corresponds to the noise signal;

means for generating a control signal to control the insertion losses of the attenuators, the control signal generating means responsive to the reference signal and to the noise signal, the control signal being proportional to the reference signal in one case where the potential of the reference signal is said first potential, the control signal otherwise being restrained from being proportional to the reference signal by an amount derived as a function of said noise signal, so that when the terminal apparatus is operating in the transmit or idle modes, the overall gain in the transmit channel is inversely tempered by the noise signal.

4. An apparatus as defined in claim 3 in which the means for generating the control signal comprises:

means for amplifying the reference signal;

means for generating a direct current substantially proportional to the noise signal;

feedback means for regulating the gain of the amplifying means, the feedback means responsive to the direct current whereby in the absence of the direct current the amplifying means has a predetermined amount of gain and in the presence of the direct current the amplifying means has a gain effectively reduced in inverse relation to the direct current;

direct current switching means for connecting the direct current from the direct current generating means to the feedback means when the reference voltage is at said second or third potentials.

5. An apparatus as defined in claim 3 in which the first and second potentials are determined by an upper reference voltage and a lower reference voltage, respectively, supplied to the reference signal generating means via upper and lower reference voltage terminals respectively, the reference signal generating means further comprising:

first, second and third resistance means, the third resistance means connected between the lower reference voltage terminal and the first and second resistance means, the reference signal being obtained from the first resistance means, first control means for permitting current to flow from the upper reference voltage terminal via the first and third resistance means, to the lower reference voltage terminal when the signal from the coupling means is effectively greater than the signal from the transmit attenuator, second control means for permitting current to flow from the upper reference voltage terminal via the second and third resistance means, to the lower reference voltage terminal essentially when there are substantially only monotonous amplitude signals at the input of the transmit attenuator and also essentially when the signal from the coupling means is effectively greater than the signal from the transmit attenuator.

6. An apparatus as defined in claim 3 in which the control circuit further comprises:

comparing means for generating a noise/speech signal, as an indication of whether or not the signal from the output of the transmit attenuator substantially corresponds to the noise signal, the comparing means responsive to the noise signal and to acoustic signals in total received by the transmit channel, whereby when the acoustic signals are less than a level as determined by the noise signal, said correspondence with the signals at the output of the transmit attenuator is indicated;

means for augmenting the level determined by the noise signal during operation in the receive mode, and for a time thereafter so that the comparing means is substantially prevented from being responsive to acoustic voice speech-like signals from the receive channel somewhat delayed by room reverberation and therefore tending to appear as similar to speech from the user.

7. In a method of operating a loudspeaking communication terminal apparatus including the steps of; activating a transmit channel to pass signals from a microphone to a transmission facility, to provide a transmit mode of operation and, activating a receive channel to pass signals from the transmission facility to a loudspeaker, to provide a receive mode of operation, an improvement in the method of operating, comprising the steps of:

a. generating a noise reference signal representing sounds received by the microphone which are of a substantially monotonous nature; and when the transmit channel is activated, b. regulating the amplification of the transmit channel, in inverse relation to the noise reference signal, whereby the natural tendency of a user to speak more loudly in an environment characterized by the presence of substantially steady noise is compensated for, to present a more constant signal level to the transmission facility.

8. In a method of operating a voice controlled loudspeaking communication terminal apparatus including a receive channel connected to a loudspeaker, a microphone connected to a transmit channel, the product of the amplifications of the receive and transmit channels being substantially constant, and a control means for operating the terminal apparatus in transmit, receive, and idle modes of operation, an improvement in the method of operation comprising the steps of:

a. generating a noise reference signal representing sounds received by the microphone which are of a substantially monotonous nature;
b. regulating the amplification of the transmit channel when in the transmit and idle modes of operation, in inverse relation to the noise reference signal;
c. comparing signals received by the transmit channel with a threshold level as determined by the noise reference signal, whereby the presence of voice speech-like envelope signals received by the transmit channel and in excess of the threshold level is indicated, said indication functioning to urge the apparatus into the transmit mode of operation in the absence of significant signals from the transmission facility;
d. augmenting the threshold level during operation in the receive mode and for a time thereafter whereby said indication is substantially prevented in response to the ends of syllables and words from the loudspeaker, which have been acoustically delayed by the operating environment.

9. An apparatus as defined in claim 3 in which the reference signal generating means includes means for momentarily augmenting the signal received by the reference signal generating means from the coupling means, at the moment the signal from the coupling means becomes effectively greater than the signal from the transmit attenuator, to prevent a rapid return from said first predetermined potential to said second predetermined potential, in the case where the first speech syllable from a party at the remote end of the transmission facility is of an abnormally low level.

* * * * *